July 25, 1939.  H. O. SHIELDS  2,166,974
APPARATUS FOR TREATING COTTONSEED
Filed April 14, 1937
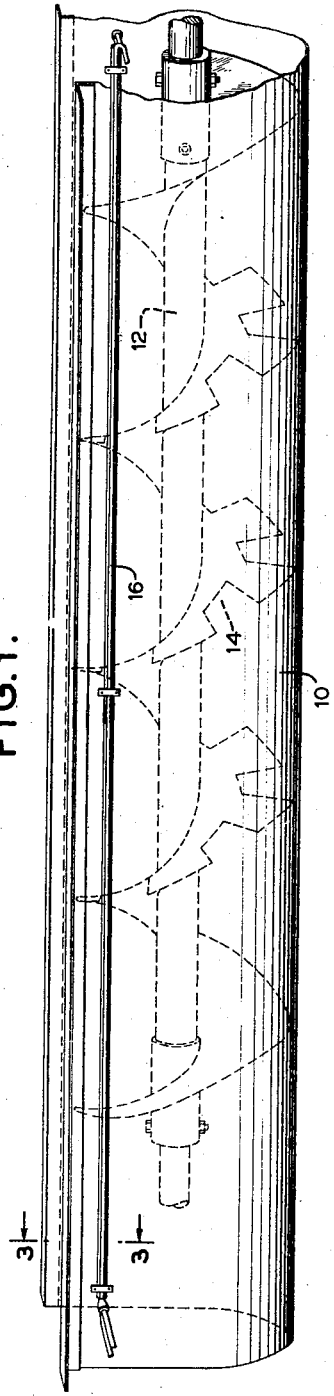
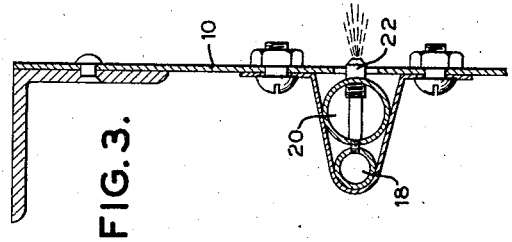
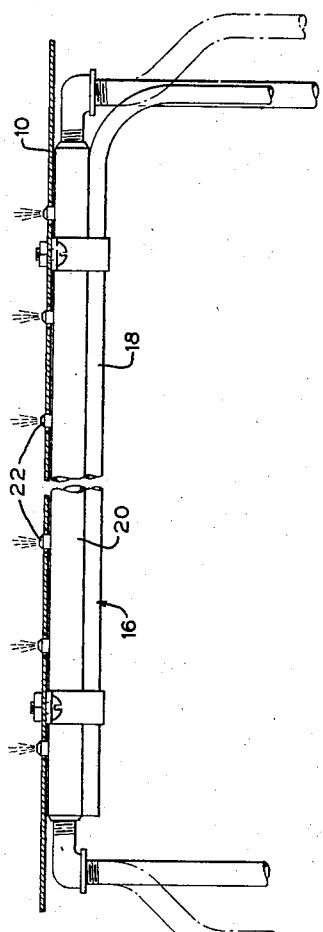
Hardin O. Shields
INVENTOR
BY R. J. Dearborn
ATTORNEY Patented July 25, 1939

2,166,974

UNITED STATES PATENT OFFICE 2,166,974

APPARATUS FOR TREATING COTTONSEED

Hardin O. Shields, Abilene, Tex., assignor to The Texas Company, New York, N. Y., a corporation of Delaware Application April 14, 1937, Serial No. 136,766

2 Claims. (Cl. 19—66)

This invention relates to an apparatus for treating cotton seed after the seed has been separated from the long fibers of cotton in the usual ginning operation for the purpose of eliminating or at least minimizing the breaking and subsequent loss of the short fibers which normally fly as lint dust during the subsequent cleaning operations. The invention will be more clearly understood if a brief reference is made to the usual method of handling and treating cotton.

After cotton is picked it is ordinarily removed to a gin where most of the long fibers are removed or separated from the seeds by means of gin saws which pull the fibers off the seeds. The seeds thus stripped of the long fibers and having left on them only relatively short fibers known as lint, are removed from the gin to an oil mill for further treatment. Here they are stored in a seed house where they may remain anywhere from three months to two years. During the period of storage the short cotton fibers left on the seeds generally become very brittle and are therefore easily broken, so that in the subsequent handling, as in the cleaning operation, these short fibers may be broken off and lost in what is known as lint dust.

When the seeds are to be used they are removed from the seed house to a cleaning room, generally by means of a continuously moving conveyor which extends the entire length of the seed house and into the cleaning room. When the cleaning operation has been completed the seeds are removed to a linter room where they are subjected to the action of what are known as first and second cut linters. The linters, which are generally similar to gin stands, the only difference being in the number of saws and the pitch of the saw teeth, act upon the seeds to remove the remaining short length cotton fibers. The fibrous lint from the first cut linters is removed from the linter saws by a system of brushes, the lint being rolled off in a soft roll and baled in the same manner as cotton. After going through the first cut linters the seeds are carried through the second cut linters and the remaining lint which is removed from the seeds is blown to a press by means of air through a system of flues.

The present invention has for one of its objects to condition the fibers remaining on cotton seed after the ginning operation. Experience has shown that the conditioning agent can be applied to best advantage while it is being moved from the seed house to the cleaning room. The conditioning of the fibers renders them less brittle and less likely to break during the cleaning operation, and therefore makes it possible to produce a better grade of lint or, in other words, a lint composed of long and more workable fibers. It is another object of the invention to so condition the fibers remaining on the cotton seed that there will be less fly in the mill and therefore more healthy conditions for the operators to work in. With the reduction of fly it will, of course, be possible to produce from a given number of tons of seed a greater amount of lint. The conditioning of the fibers is accomplished according to the present invention by applying to them a conditioning agent in the nature of an oil in a finely divided state which will render the fibers pliable, make them easier to cut, keep the linter saws lubricated and therefore prolong their wearing qualities, reduce the fly in the mill and increase belt life as flying lint does not get on the belts and cause slipping and wear.

Other objects, features and advantages of the invention will appear from the following description and by reference to the accompanying drawing, in which Fig. 1 is a front view of a conveyor trough containing a cut flight screw conveyor, and equipped with a manifold for spraying in the trough.

Fig. 2 is an enlarged partial view of the spray manifold in position on the trough, and Fig. 3 is an enlarged sectional view taken on line 3—3 of Fig. 1.

In the drawing there is illustrated a horizontally disposed conveyor trough 10 of the type ordinarily used for the transfer of cotton seed from a seed house to the cleaning room of an oil mill and the trough is shown equipped with screw or spiral type conveyor 12 which maintains a continuous movement of seed through the length of the trough. As shown, notches 14 are provided in a section of the conveyor on each flight or turn of the screw for the purpose of rolling the seed upside down as many times as possible as it moves through this section of the trough.

As mentioned above, it has been found that any fiber conditioning agent to be applied can best be applied while the seed is being moved from the seed house to the cleaning room, and it has been found that the most uniform application of the conditioning agent can be made to the seed as it is turned over and over in the conveyor trough 10 by the action of the cut flight screw conveyor 12. Accordingly, a spray manifold 16 is mounted on the side of the trough 10, and preferably one on each side of the trough, so arranged as to direct a spray of finely atomized conditioning agent upon the seed as the latter is moved and agitated by the notched portion of the conveyor.

The spray manifolds may be of any desired type but, as embodied in the present invention are of the type shown and described in the pending application of Hill et al., Serial No. 80,114, filed May 16, 1936. The specific form of spray manifold employed forms no part of the present invention, and any suitable device capable of directing a finely atomized spray of the conditioning agent upon the moving seed may be used. However, it may be briefly stated that in the manifold illustrated herein the conditioning agent, which may be an oil, is introduced by suitable means (not shown) to an oil manifold 18 from which it is drawn and atomized by the action of air under pressure as such air passes from an air manifold 20 to and through the several spray nozzles 22.

Preferably a spray manifold is installed on the outside and near the top of each side of the conveyor trough with the nozzles 22 extending through suitable openings provided for the purpose in the side walls of the trough. The manifolds are preferably so positioned with respect to the cut flight section of the conveyor 12 that the atomized conditioning agent will be applied to the seed as it is being tumbled about by the action of the conveyor. By the time the seed has passed through the length of this portion of the conveyor the short fibers remaining on the seed have been quite completely covered with a fine film of the conditioning agent and are in better condition for the subsequent treatments to which they are ordinarily subjected.

It has been definitely determined that cotton seed treated as herein described yields a better grade of lint, the fibers being more pliable than when not so treated, and coming off the seed in longer lengths. The advantages of the spraying process are particularly noticeable when frozen or boley seeds are being worked. Further advantages of the process may be summarized by saying that the application of the conditioning agent reduces, if it does not actually eliminate, lint fly in the cleaning and linter rooms and thereby improves working conditions in the mill; it eliminates static electricity; it prolongs the life of the seed cleaning and conveying equipment, as well as the linter saws, and materially increases the amount of first cut lint as it all goes to the bale instead of being swept up and thrown in the motes.

Obviously, many modifications and variations may be made in the invention as herein set forth without departing from the spirit and scope thereof, and therefore only such limitations should be imposed as are indicated in the appended claims.

I claim:

1. Apparatus for conditioning cotton seed and the fibers thereon comprising a conveyor trough having openings in the opposite side walls thereof, a cut-flight screw conveyor for agitating and moving the seed through the length of the trough, and spray nozzles projecting through each of said openings and adapted to spray a conditioning agent upon the seed as it is agitated and moved through the trough.

2. Apparatus for conditioning cotton seed and the fibers thereon comprising a conveyor trough, a screw conveyor for moving the seed through the length of the trough, certain flights of the conveyor being notched to more thoroughly agitate the seed as it passes through the trough, and means for applying a finely atomized conditioning agent to the seed during the period of maximum agitation thereof.

HARDIN O. SHIELDS.